United States Patent
Chen et al.

(10) Patent No.: US 7,254,163 B2
(45) Date of Patent: Aug. 7, 2007

(54) METHOD FOR WCDMA FRAME SYNCHRONIZATION AND RELATED DEVICE

(75) Inventors: Sheng-Jie Chen, Tao-Yuan Hsien (TW); Che-Li Lin, Taipei (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 704 days.

(21) Appl. No.: 10/707,663

(22) Filed: Dec. 31, 2003

(65) Prior Publication Data
US 2005/0147157 A1  Jul. 7, 2005

(51) Int. Cl.
*H04B 1/00* (2006.01)
*H04J 3/06* (2006.01)

(52) U.S. Cl. .................. 375/150; 375/149; 375/147; 370/350

(58) Field of Classification Search ............. 375/150, 375/331, 350, 152, 351, 142, 364–367, 147, 375/149; 455/437; 370/331, 350, 332, 503, 370/506, 509, 336
See application file for complete search history.

(56) References Cited

U.S. PATENT DOCUMENTS

| | | | |
|---|---|---|---|
| 7,110,376 B2 * | 9/2006 | Lindoff et al. .............. 370/331 |
| 7,170,875 B2 * | 1/2007 | Tanno et al. ................. 370/335 |
| 7,194,011 B1 * | 3/2007 | Nassiri-Toussi et al. .... 370/503 |
| 2001/0021199 A1 * | 9/2001 | Lee et al. .................... 370/503 |
| 2003/0012270 A1 * | 1/2003 | Zhou et al. .................. 375/150 |
| 2004/0161020 A1 * | 8/2004 | Mathew et al. ............. 375/149 |
| 2005/0047492 A1 * | 3/2005 | Amerga et al. ............. 375/150 |

\* cited by examiner

*Primary Examiner*—Mohammed Ghayour
*Assistant Examiner*—Sophia Vlahos
(74) *Attorney, Agent, or Firm*—Winston Hsu

(57) ABSTRACT

A method for performing frame synchronization in a WCDMA system includes first, correlating a received signal with a plurality of predetermined correlators to obtain a plurality of frame synchronization correlation results, then, coherently combining frame synchronization correlation results with a slot synchronization phase when a test phase difference is less than a threshold phase difference, or, coherently combining frame synchronization correlation results with a linear combination of slot synchronization phases when the test phase difference is greater than or equal to the threshold phase difference. The slot synchronization phase is determined by correlating the received signal with a slot synchronization sequence. Lastly, the method determines a frame boundary of the received signal based on the coherent combination results. The method accommodates for a changing signal to noise ratio to improve frame synchronization speed and accuracy.

15 Claims, 13 Drawing Sheets

METHOD FOR WCDMA FRAME SYNCHRONIZATION AND RELATED DEVICE

BACKGROUND OF INVENTION

1. Field of the Invention

The present invention relates to cell searching in a wideband code division multiple access (WCDMA) system, and more specifically, to frame synchronization in a WCDMA system.

2. Description of the Prior Art

Spread spectrum communication systems are becoming increasingly important in cellular networks. In particular, wideband code division multiple access (WCDMA) systems are entering the marketplace, and offer the potential of significantly increased performance and reliability.

To establish a network connection in a WCDMA system, the user equipment (UE) must first perform a cell search procedure. The cell search procedure enables the UE to obtain timing and code synchronization for the downlink channel. Various methods are known in the prior art for performing a cell search procedure. Attention is drawn, for example, to the article "Cell Search in W-CDMA" by Yi-Pin Eric Wang and Tony Ottosson in Vol.18, No.8 (August 2000 edition) of *IEEE Journal on Selected Areas in Communications,* which is included herein by reference.

A simple overview of cell searching is presented in the following. Please refer to FIG. 1. FIG. 1 is a block diagram of a downlink Common Control Channel (CCH) 10 in a WCDMA system. The CCH 10 is broken up into a series of frames 12. Each frame 12 contains fifteen slots 14. Each slot 14 holds ten symbols, each of 256 chips. Hence, each slot 14 is 2560 chips in length. Please refer to FIG. 2 in conjunction with FIG. 1. FIG. 2 is a block diagram of a slot 14 in the CCH 10. The first symbol 16 in each slot 14 holds a primary synchronization channel (PSCH) 16p and a secondary synchronization channel (SSCH) 16s. The remaining nine symbols 18 follow after the first symbol 16 is the primary common control physical channel (P-CCPCH). The PSCH 16p and SSCH 16s are orthogonal to each other, and hence can be broadcast on top of each other. The PSCH 16p is encoded by way of a primary synchronization code (PSC) that is the same for all base stations, and that does not change. The SSCH 16s consists of repeatedly transmitting a sequence of 15 modulated codes each of length 256 chips. These secondary synchronization codes (SSC) are transmitted in parallel with primary SCH. Each SSC is chosen from a set of 16 different codes of length 256 chips. The sequence of the secondary SCH indicates to which code group the cells downlink scrambling code belongs. Please refer to FIG. 3. FIG. 3 is a block diagram of a common pilot channel (CPICH) 20 broadcast with the CCH 10. The coding used for the CPICH 20 is unique to the broadcasting base station. In a WCDMA system, a base station can use one of 512 different primary scrambling codes for the CPICH 20, which are broken into 64 code groups, each having 8 respective codes. The PSC of the PSCH 16p is common across all base stations, and can thus be used for slot 14 synchronization. Although the SSC of the SSCH 16s changes on a slot 14 by slot 14 basis, the sequence pattern of code change of the SSCH 16s is determined by the code group into which the code used for the CPICH 20 lies. That is, there are 64 code sequence patterns for the SSCH 16s to follow, each of which corresponds to a particular code group associated with the code used for the CPICH 20. By correlating the received CCH signal 10 with all possible SSCH 16s code sequences and identifying the maximum correlation value, it is possible to learn the code group of the CPICH 20, and to obtain frame 12 synchronization. This is due to the fact that the SSCH 16s changes according to a predefined sequence, the starting sequence of which is known and which is sent at the beginning of every frame 12, thus enabling frame synchronization. Once the code group of the CPICH 20 is learned, it is possible to obtain the primary scrambling code used by the cell by performing symbol-by-symbol correlation over the CPICH 20 with all eight of the codes in the code group identified for the CPICH 20. Once the primary scrambling code used by the base station has been identified, system and cell specific broadcast channel (BCH) information can be read.

Based upon the above, cell searching is thus typically broken into the three following steps:

Step 1: Slot synchronization.

Utilize the PSCH 16p to perform slot synchronization. This is typically done with a matched filter (or similar device) that is matched to the PSC that is common to all base stations. Typically, output from the matched filter of a frame's worth of slots is non-coherently combined, and a resulting maximum peak is found. The slot boundary is obtained from the maximum peak.

Step 2: Frame synchronization and code group identification.

The slot timing obtained in step 1 is used to correlate the SSCH 16s with all possible SSC code sequences. There are sixteen SSC codes, SSC1 to SSC16, that make up the SSCH code sequence. The SSCs are correlated over a frame's worth of slots and accumulated over all possible frame boundaries to yield a table of values. Each entry in the table has a column/row position that indicates the corresponding scrambling code group and frame slot boundary of the entry. The maximum entry in the table is chosen as the candidate for frame boundary and code group determination.

Step 3: Scrambling code identification.

Symbol-by-symbol correlation is performed on the CPICH 20 for all scrambling codes within the code group identified in step 2. The maximum correlation value is selected as the primary scrambling code of the base station. This maximum correlation value is acceptable only if it exceeds a threshold value.

Please refer to FIG. 4. FIG. 4 is a simple block diagram that illustrates cell synchronization for a prior art UE 30. Of course, the UE 30 will contain many more components than those shown in FIG. 4, which is restricted to the present discussion. The UE 30 includes a transceiver 39 and a synchronization stage 38. The transceiver 39 receives broadcasts from a base station (not shown) and passes broadcast data to the synchronization stage 38 in a manner familiar to those in the art of wireless devices. The synchronization stage 38 includes a stage 1 31, a stage 2 32 and a stage 3 33. The stage 1 31 performs the slot synchronization of step 1 discussed above. Results from stage 1 31 are passed to stage 2 32, which performs the frame 12 synchronization and code group identification of step 2. Results from stage 2 32 are then passed on to stage 3 33, which performs the scrambling code identification of step 3.

Stage 1 31 includes a peak profiler 34. The peak profiler 34 contains the PSC 35 that is common to all base stations, and generates peak profile data 36 that is obtained by matching the PSC 35 against the PSCH 16p received from the transceiver 39, and which is non-coherently combined over a frame 12 of slots 14. The profile data 36 holds data for a predetermined number of chips, and as the PSCH 16p repeats with every slot 14, it is common to hold enough data to cover an entire slot 14, i.e., 2560 chips. The chip in the profile data 36 having the highest peak profile is assumed to mark the PSCH 16$p$, and is thus used as the slot boundary offset 37. This is illustrated in FIG. 5, which is an example graph of peak profile data 36 (not to scale). Stage 1 31 notes that in the profile data 36 a maximum valued peak occurs at chip number 1658. The slot boundary offset 37 would thus hold a value indicative of the peak path position at chip 1658. The slot boundary offset 37 is forwarded to stage 2 32 as the slot 14 synchronization point. Utilizing the slot 14 position marked by the slot boundary offset 37, stage 2 32 performs step 2 outlined above to generate a code group value 32$g$ and a slot number 32$s$.

The stage 2 32 has a correlation unit 32$c$ that generates a correlation table 32$t$ based upon the slot boundary offset 37 and the correlation results of the SSCH 16$s$ with the SSCs. The correlation unit 32$c$ contains 16 SSC correlators. Assume $$\alpha_0 \sim \alpha_{15}$$

are the outputs of 16 SSCH correlators (slot rate). The lower table c in FIG. 6 is the allocation of SSCs for the secondary SCH, which is used for table look-up. The right table w is used for recording the accumulated results over 15 slots. The decision of frame boundary and code group can be described clearly with the following steps:

for slot=0:14
  for group=0:63
    for shift=0:14
      w(group, shift)+=$\alpha$
    next shift
  next group
next slot The maximum value corresponds to a code group and a slot number. The corresponding slot number 32$s$ is the difference in number of slots from the current slot boundary, i.e. we get the frame boundary. The corresponding code group 32$g$ is the group number of the scrambling code used in the current cell.

The stage 3 33 also includes a correlation unit 33$c$, which correlates the CPICH 20 with all possible primary scrambling codes contained within the code group 32$g$. The correlation results 33$r$ are respectively obtained in this manner for the primary scrambling codes. The primary scrambling code having the largest correlation result is chosen as the primary scrambling code 33$p$, but only if the corresponding correlation result exceeds a threshold value 33$x$. For example, if each code group contains eight primary scrambling codes $S_0$ to $S_7$, the primary correlation results 33$r$ would be: $C_0$, $C_1$, $C_2$, $C_3$, $C_4$, $C_5$, $C_6$, $C_7$, which are respectively the primary correlation results of the eight primary scrambling codes $S_0$ through $S_7$ in the code group indicated by the code group number 32$g$. If $C_6$ holds the highest primary correlation value, then the stage 3 33 would place the value of "6" as the primary scrambling code number 33$p$, assuming that $C_6$ also exceeded the threshold value 33$x$.

Conventionally, in stage 2 32 an estimated PSCH phase is referenced by the correlation unit 32$c$ when performing coherent combination to generate the correlation table 32$t$. That is, the phase correction applied to the SSCH 16$s$ signal is based on the phase error of the corresponding PSCH 16$p$ signal because the SSCH is transmitted in parallel with the PSCH and the PSCH is the same in every slot 14. This is why we can use the phase reference estimated from the PSCH. While in high signal to noise ratio (SNR) situations this is adequate, when the SNR is low, the correlation unit 32$c$ suffers from performance degradation. Thus, referencing the PSCH phase without considering noise can lead to slower frame synchronization and corresponding slower cell searching.

SUMMARY OF INVENTION

It is therefore a primary objective of the claimed invention to provide a method for frame synchronization and related device that compensate for noise to solve the above problems.

Briefly summarized, the claimed invention method includes first, correlating a received signal with a plurality of predetermined correlators to obtain a plurality of frame synchronization correlation results, then, coherently combining frame synchronization correlation results with a slot synchronization phase when a test phase difference is less than a threshold phase difference, or, coherently combining frame synchronization correlation results with a linear combination of slot synchronization phases when the test phase difference is greater than or equal to the threshold phase difference, before finally, determining a frame boundary of the received signal based on the coherent combination results. In the claimed method, the slot synchronization phase is determined by correlating the received signal with a slot synchronization sequence.

According to the claimed invention, a wireless device includes a receiver for receiving a signal divided into frames with each frame comprising a plurality of slots, a first stage for receiving slot synchronization phases of a received signal, and a plurality of correlators for outputting a plurality of frame synchronization correlation results of the received signal. Further provided is a combiner for coherently combining the frame synchronization correlation results with a slot synchronization phase when a test phase difference is less than a threshold phase difference, or a linear combination of slot synchronization phases when the test phase difference is greater than or equal to the threshold phase difference. Lastly, the wireless device includes a selection unit for selecting a frame boundary based on the output of the combiner.

It is an advantage of the claimed invention that coherently combining frame synchronization correlation results with a linear combination of slot synchronization phases reduces effects of high signal noise.

It is a further advantage of the claimed invention that the selectable threshold can optimize frame synchronization and the corresponding code group determination.

These and other objectives of the claimed invention will no doubt become obvious to those of ordinary skill in the art after reading the following detailed description of the preferred embodiment that is illustrated in the various figures and drawings.

DETAILED DESCRIPTION

Figure 7:
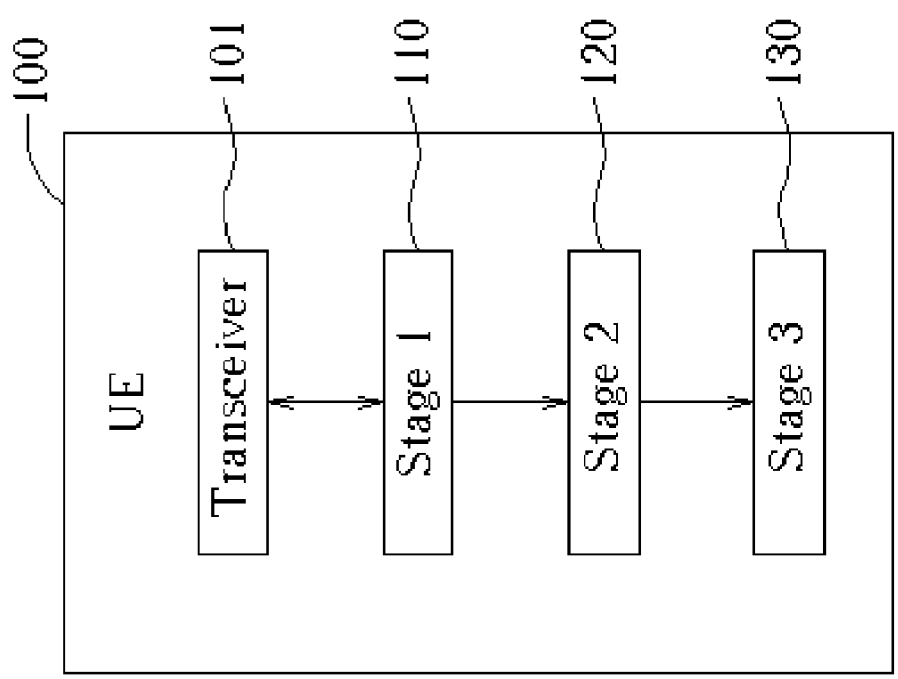
FIG. 7 is a block diagram of a UE according to the present invention.

Please refer to FIG. 7. FIG. 7 is a block diagram illustrating a UE 100 according to the present invention. Although not shown in FIG. 7, the various stages and units in the UE 100 may be implemented by way of a central processing unit (CPU) executing the appropriate program code to perform the method of the present invention, as detailed in the following. The arrangement of a CPU with program code to perform cell search procedures is well known in the art, and coding the present invention method should be well within the means of one reasonably skilled in the art after reading the following detailed description of the preferred embodiment. Alternatively, dedicated hardware may be used to implement some or all portions of the present invention method. Further, it should be understood that the various units, stages, and data structures do not need to match the compartmental arrangement depicted in FIG. 7.

Much of the present invention UE 100 is similar to the prior art UE 30. In particular, the UE 100 includes a transceiver 101, a stage 1 110, and a stage 3 130 that are equivalent to the prior art UE 30. The UE 100 further includes a stage 2 120 that performs the present invention frame synchronization and cell search method.

Figure 8:
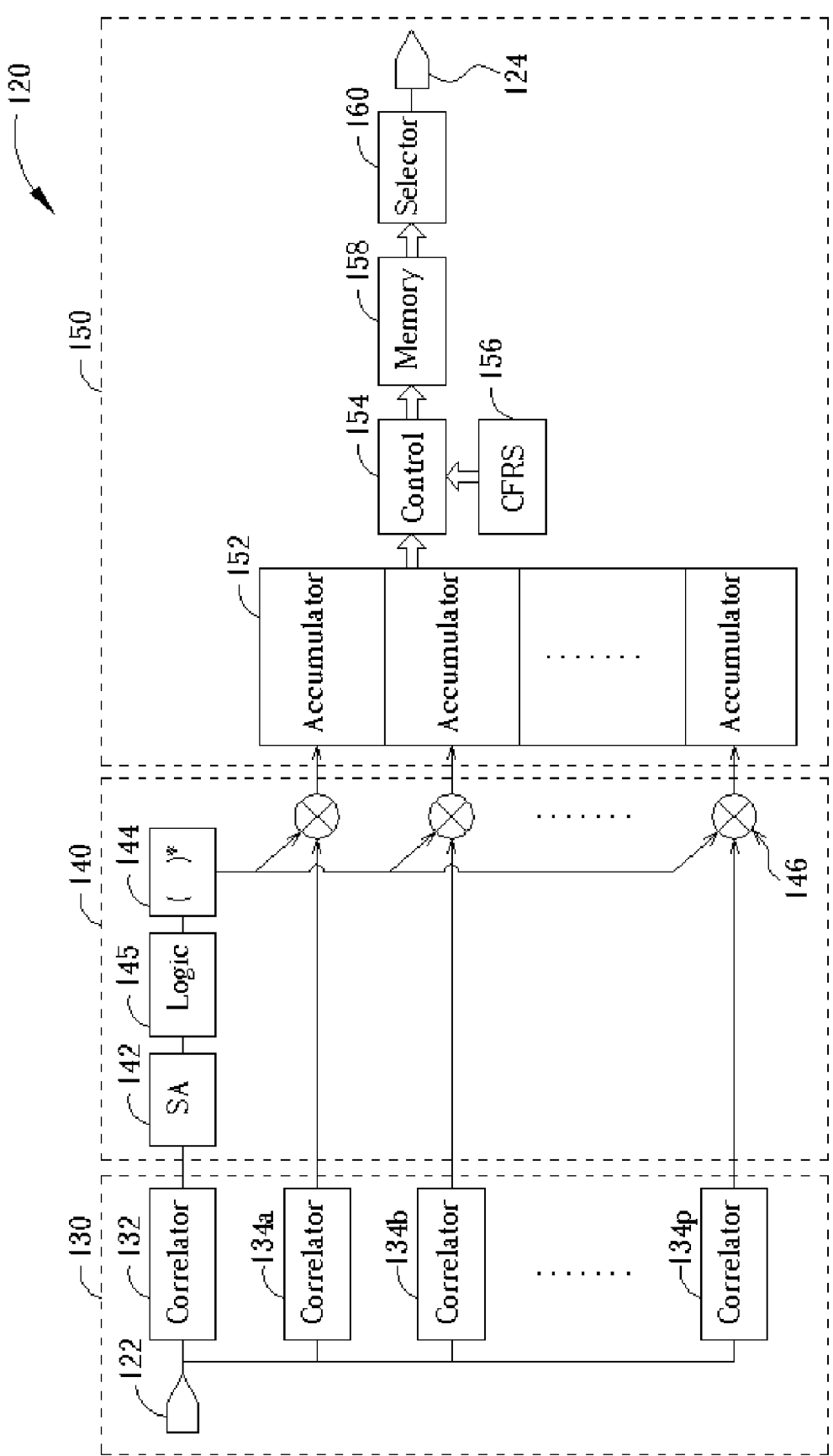
FIG. 8 is a block diagram of the stage 2 of FIG. 7.

Please refer to FIG. 8 illustrating components of the stage 2 120. The stage 2 120 comprises a plurality of correlators 130, a combiner 140, and a selection unit 150. The plurality of correlators 130 includes a correlator 132 responsive to the PSCH slot synchronization signal and correlators 134a-p responsive to 16 secondary (frame) synchronization codes (SSC). The stage 1 110 output signal 122 is input to the correlators 132, 134a-p, and each correlator 132, 134a-p outputs a correlation result to the combiner 140.

The combiner 140 includes an simple average (SA) processor 142 for averaging output from the correlator 132, a decision logic 145, a complex conjugate processor 144 for taking the complex conjugate of output of the decision logic 145, and a plurality of multipliers 146 for coherently combining the frame synchronization correlation results of the correlators 134a-p with an estimated phase from the correlator 132 result. Specifically, the SA processor 142 and complex conjugate processor 144 receive and process output of the correlator 132 as limited by the decision logic 145, then forward the processed output to each of the multipliers 146. The processing performed by the decision logic 145 includes determining whether the primary (slot) synchronization phase or a linear combination of primary (slot) synchronization phases is output based on a mean square error (MSE) threshold, which will be described further. Moreover, the SA processor 142, the decision logic 145, and the complex conjugate processor 144 can be rearranged, consolidated, or separated according to design requirements as determined by one skilled in the art. Each of the secondary correlators 134a-p outputs a correlation result to a corresponding multiplier 146, which then coherently combine the frame synchronization correlation results with the output of the complex conjugate processor 144. Outputs of the multipliers 146 are connected to the selection unit 150.

Figure 1:
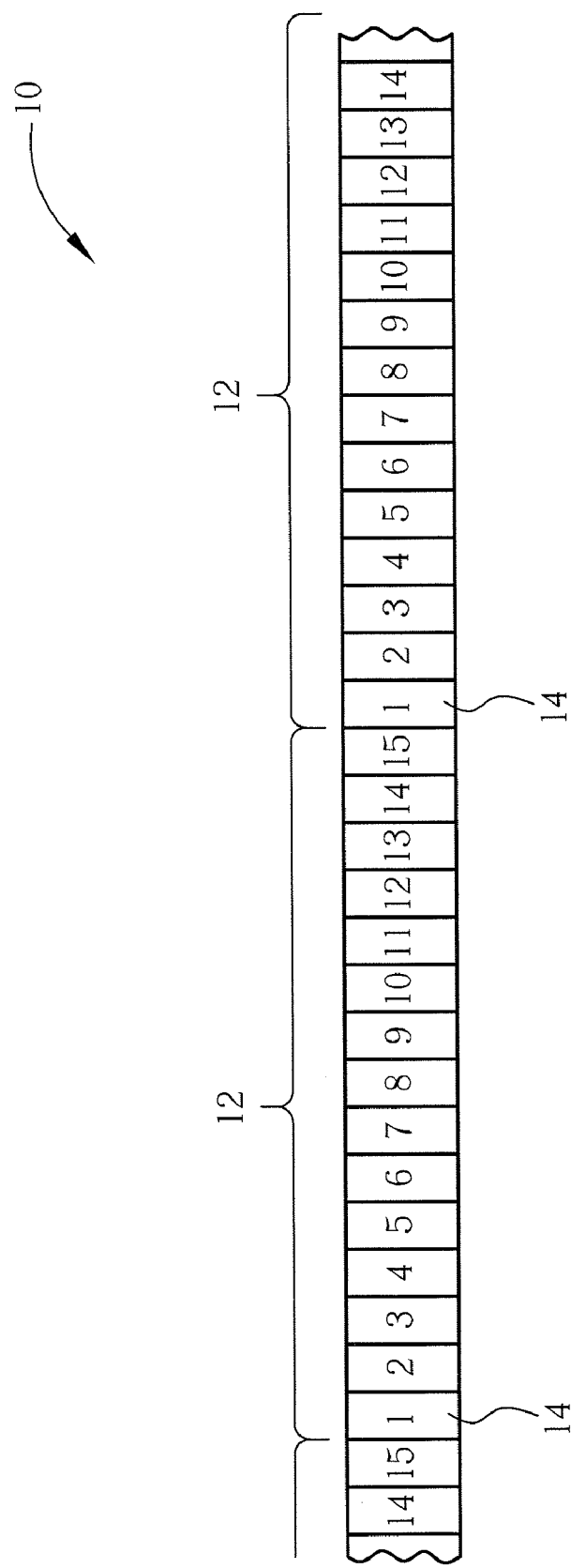
FIG. 1 is a block diagram of a downlink Common Control Channel (CCH) in a WCDMA system.
Figure 2:
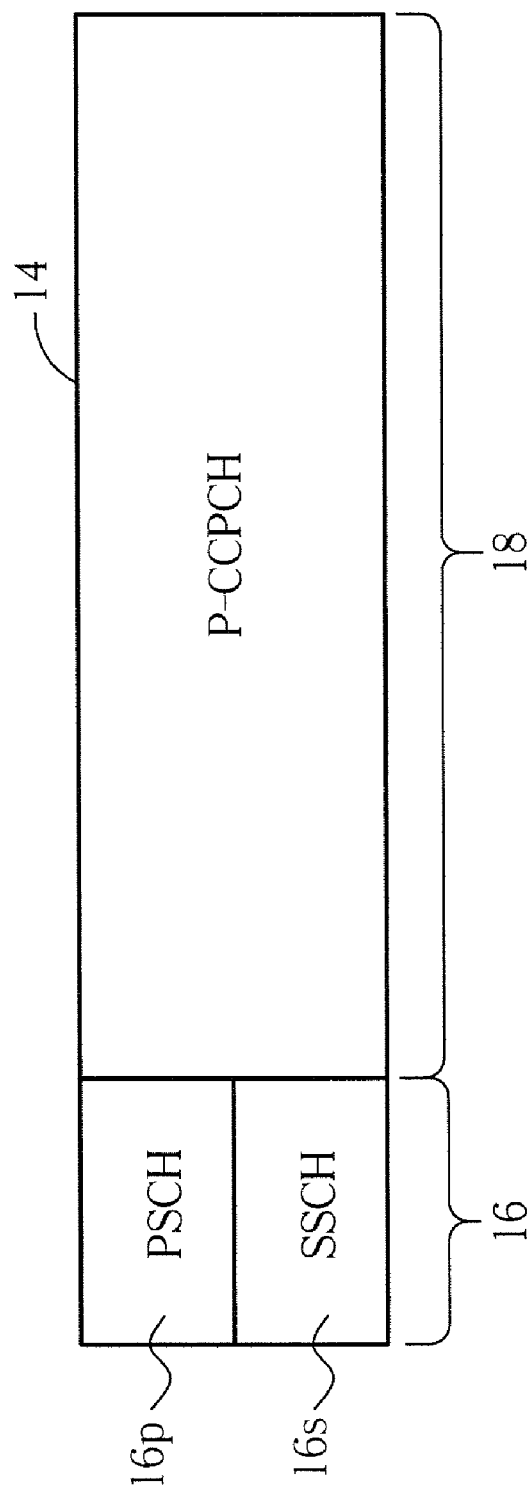
FIG. 2 is a block diagram of a slot in the CCH depicted in FIG. 1.
Figure 3:
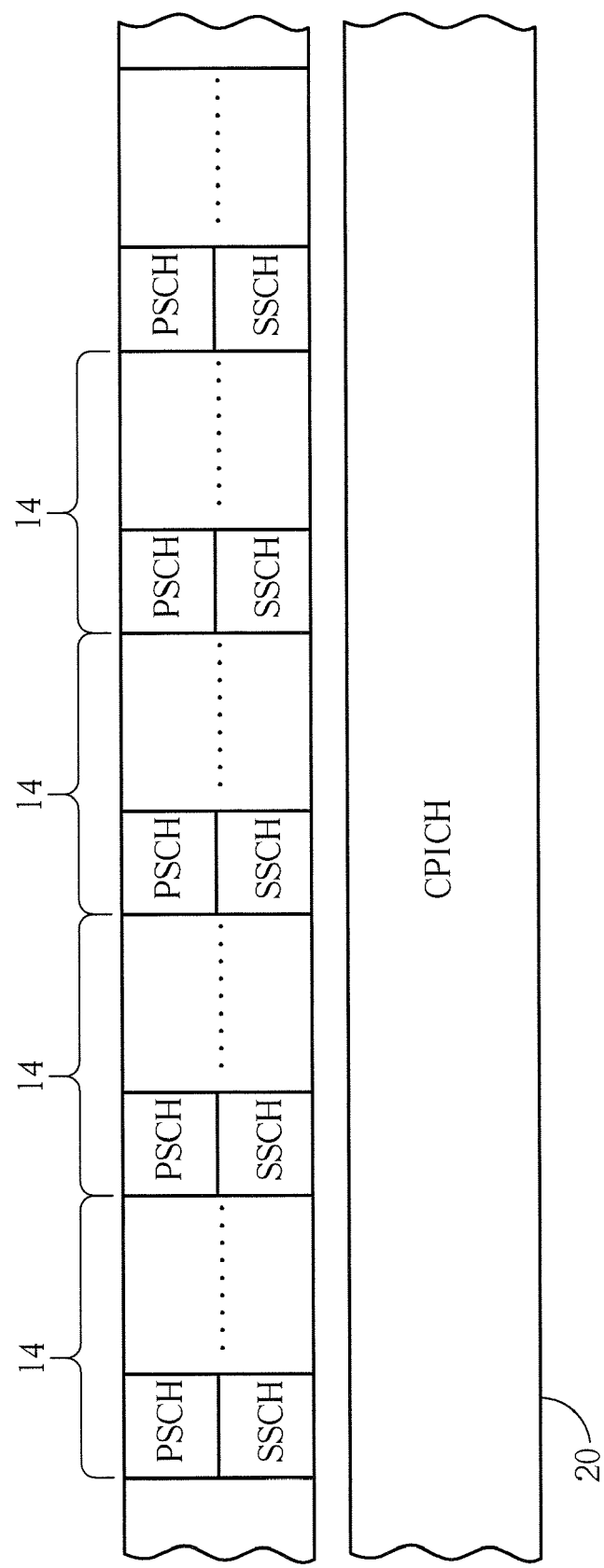
FIG. 3 is a block diagram of a common pilot channel (CPICH) broadcast with the CCH of FIG. 1.
Figure 4:
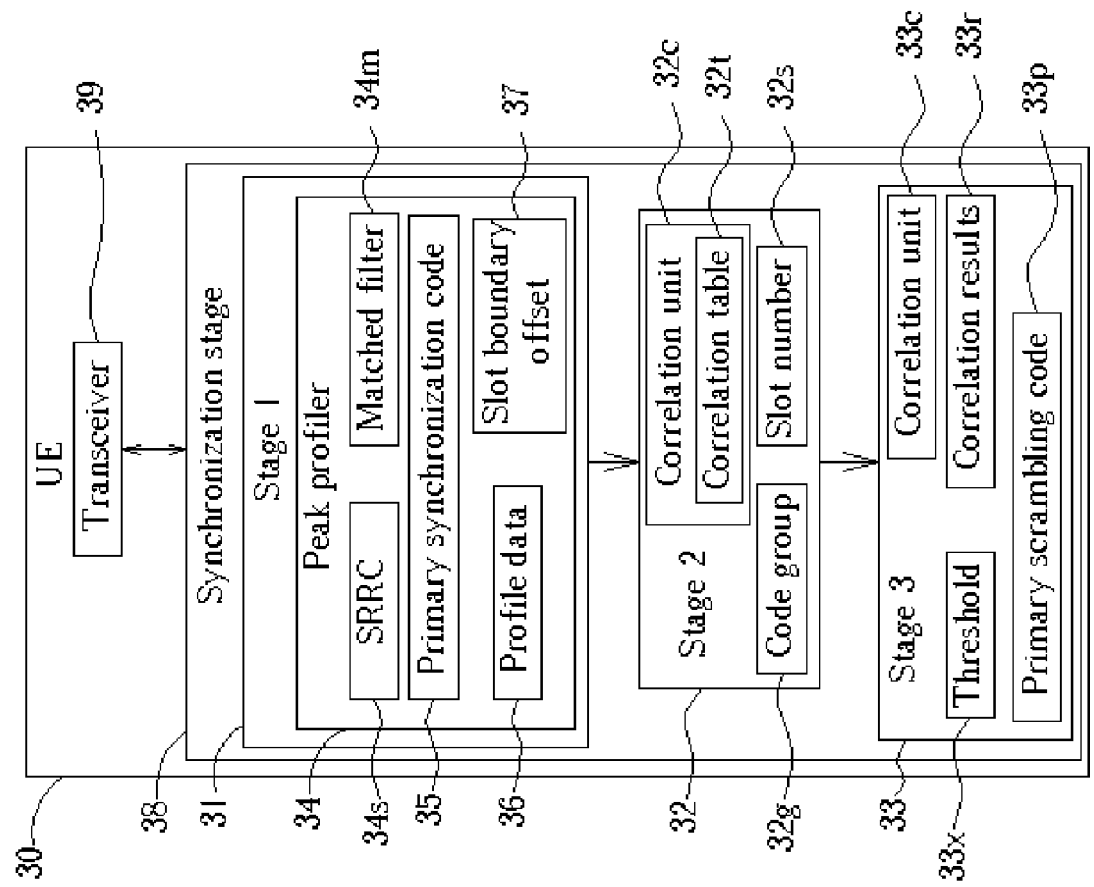
FIG. 4 is a simple block diagram that illustrates cell synchronization portions of prior art user equipment (UE).
Figure 5:
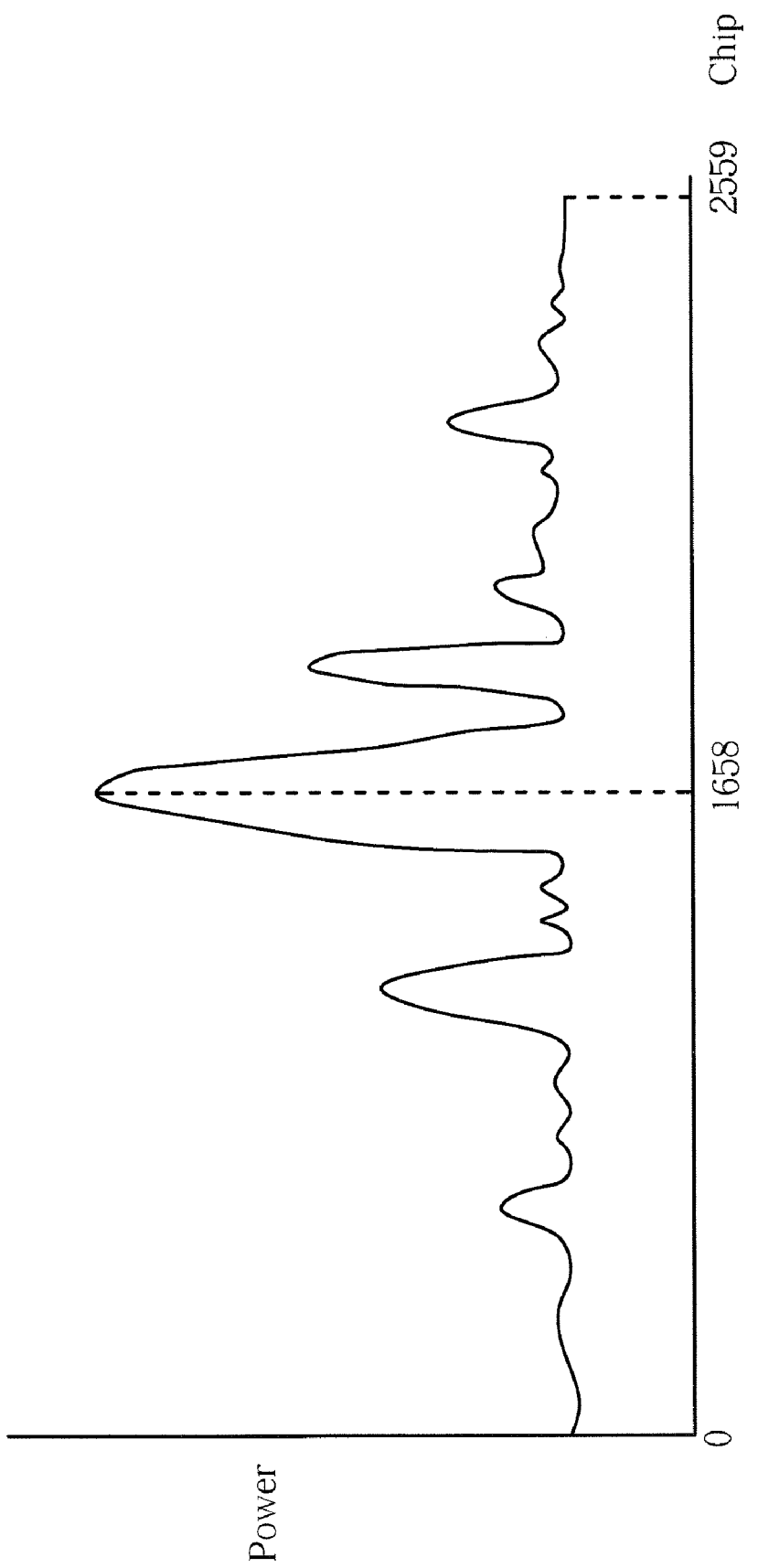
FIG. 5 is an example graph of peak profile data depicted in the UE of FIG. 4.
Figure 6:
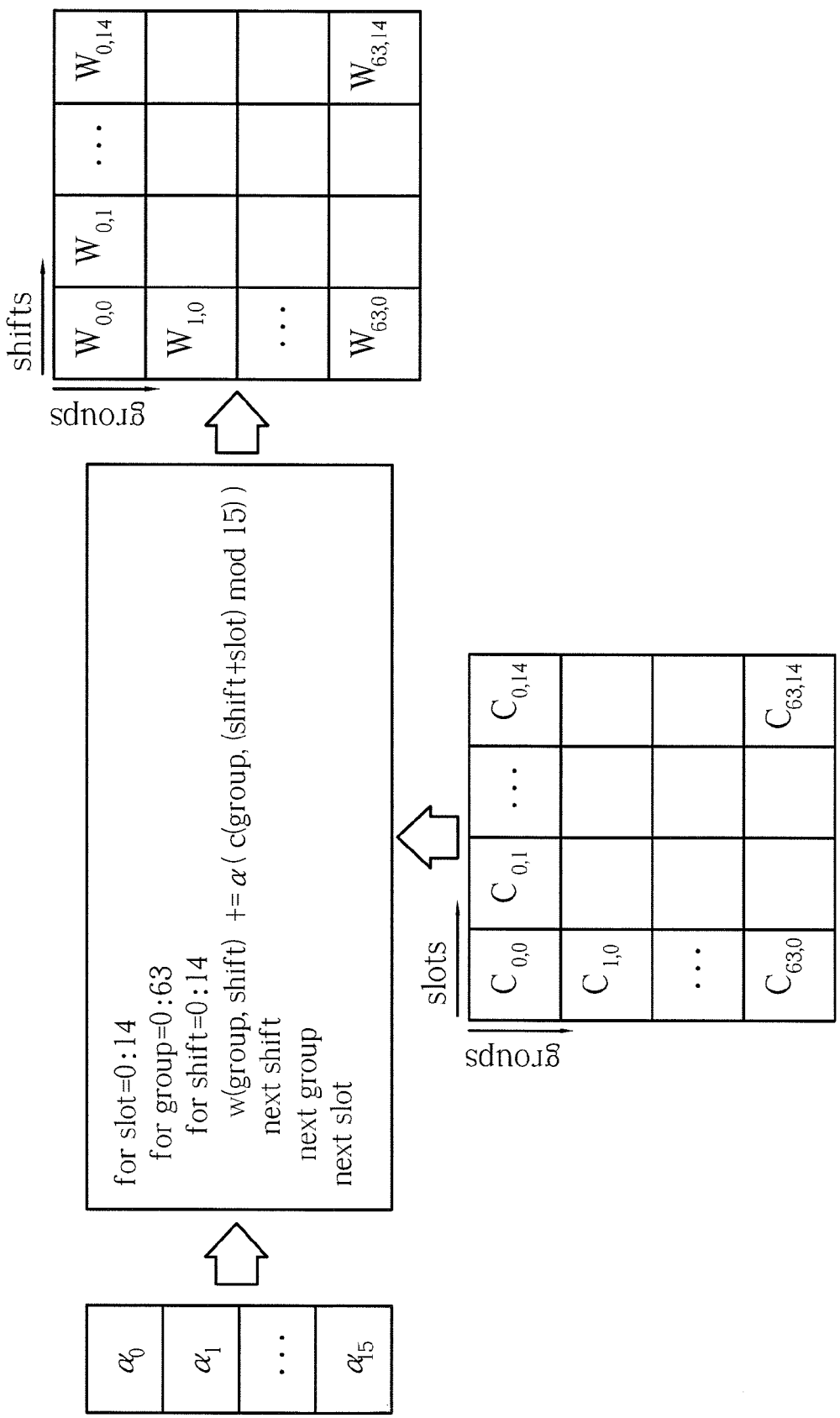
FIG. 6 illustrates a correlation table indicated in FIG. 4.

The selection unit 150 includes a plurality of accumulators 152 each connected to a corresponding multiplier 146, a controller 154, a Comma-Free Reed-Solomon (CFRS) unit 156, a memory 158, and a selector 160. The accumulators 152, controller 154, CFRS unit 156, and memory 158 generate the correlation table 32t of FIG. 6. Specifically, these components accumulate and tabulate the entries Wxx representing the correlation results of the SSCH 16s (FIG. 2) code group sequences. After the table 32t is generated, the selector 160 then selects a maximum value entry to determine the frame boundary and code group. The selection unit 150 is essentially a frame boundary and code group decision circuit, which determines and out-puts a code group 124 of the received signal 122.

Generally, operation of the stage 2 circuit 120 is as follows. The primary and secondary correlators 132, 134a-p output a plurality of frame synchronization correlation results to the combiner 140. The decision logic 145 determines whether the frame synchronization correlation results of the correlators 134a-p are coherently combined with the slot synchronization phase output of the primary correlator 132 or a linear combination of slot synchronization phases of the current and previously received slots. This determination is performed referencing an MSE of the slot synchronization phases of the current and previously received slots and a specifically selected threshold to maximize the probability that the correct code group output 124 is selected.

The SA processor performs operations based on the following equations (1), (2), and (3):

$$\Delta P(n) = P(n) - P(n-1) \quad (1)$$

where $\Delta P(n)$ is a phase difference for the slot under consideration;

$P(n)$ is the slot synchronization phase of the current slot; and $P(n-1)$ is the slot synchronization phase of the previous slot.

In the preferred embodiment, 14 differences corresponding to the 15 slots making up a frame are used. It should be noted that as the present invention aims to achieve frame synchronization, the 15 slots processed need not correspond to a single frame they need only be contiguous. The mean of this plurality of slots is calculated according to:

$$\Delta P_{MEAN} = \sum_{n=1}^{14} \frac{\Delta P(n)}{14} \quad (2)$$

with an MSE being further determined by:

$$\Delta P_{MSE} = \sum_{n=1}^{14} \frac{(P(n) - \Delta P_{MEAN})^2}{14} \quad (3)$$

The equations (1), (2) and (3) are performed by the decision logic 145. After performing these calculations, the decision logic 145 compares the calculated $\Delta P_{MSE}$ value to a threshold, which is set according to the signal to noise ratio (SNR) of the received signal. The threshold can be set at any time and to any value that optimizes operation of the present invention. For example, for a first mobile phone, the threshold could be factory set to a permanent value based on experimentation or calibration. However, for a second mobile phone, the threshold could be dynamically set by the systems of the phone based on realtime operational SNR measurements. Of course, a combination of these two methods, or another similarly effective method of setting the threshold could also be used.

Figure 9:
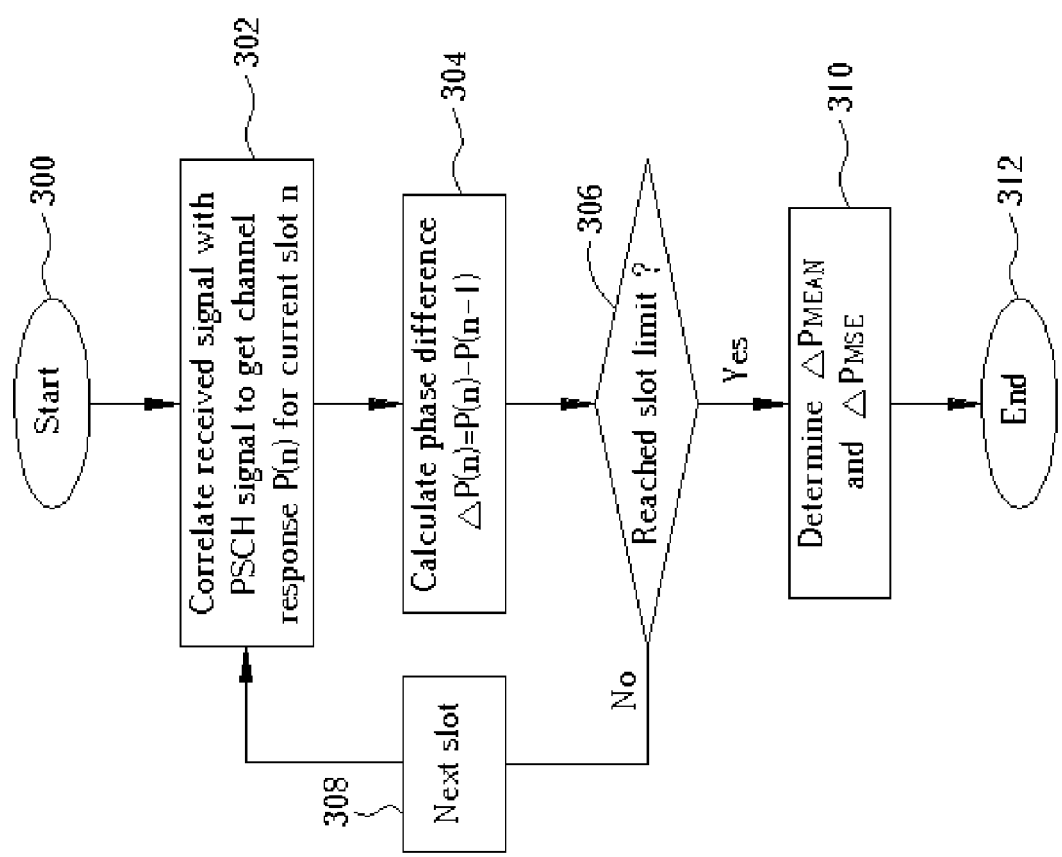
FIG. 9 is a flowchart of a mean and mean square error determination according to a first embodiment.

Referring to FIG. 9 the mean and MSE calculations according to a first embodiment are illustrated as a flowchart, which is described as follows:

Step 300: Start;

Step 302: Correlate the received signal with the PSCH signal to obtain the slot synchronization phase P(n) for the current slot being received. This is performed by the correlator 132 of FIG. 8;

Step 304: Calculate a phase difference between the slot synchronization phase P(n) for the current slot and that of the previously received slot P(n−1), according to equation (1). This and all subsequent steps are performed by the decision logic 145 of FIG. 8;

Step 306: Determine if the current slot is the 14th slot (the last slot considered). Process the next slot if required;

Step 308: Select the next slot;

Step 310: Calculate $\Delta P_{MEAN}$ and $\Delta P_{MSE}$ according to equations (2) and (3);

Step 312: End.

In the above procedure, the calculations of $\Delta P_{MEAN}$ and $\Delta P_{MSE}$ could alternatively be performed as the slots are iterated through. Specifically, a running total could be used to track the mean and a MSE.

Figure 10:
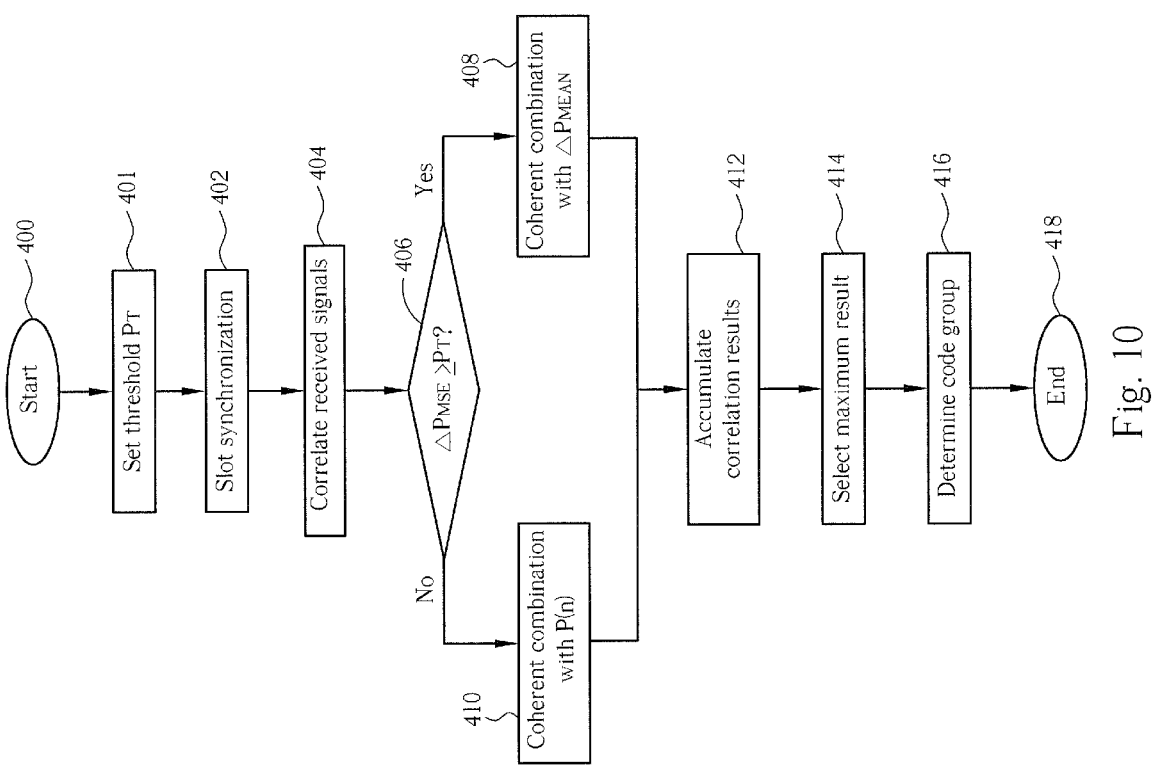
FIG. 10 is a flowchart showing a cell search method according to the present invention.

Referring to the flowchart of FIG. 10, a method of the present invention corresponding to the overall operation of the stage 2 circuit 120 of FIG. 8 is described in detail as follows:

Step 400: Start;

Step 401: The combiner sets the threshold, $P_T$ according to the expected SNR of the received signal. The threshold, $P_T$ is set such that the coherent combination of frame synchronization correlation results is with the slot synchronization phase when the SNR is in a high range, and with the linear combination of slot synchronization phases when the SNR is in a low range.

Step 402: Perform slot synchronization with the stage 1 110 of FIG. 7;

Step 404: Correlate the received signals with the correlators 132, 134a-p. Correlate the received signal with the PSCH signal to obtain the slot synchronization phase P(n) using the primary correlator 132. Correlate the received signal with the SSCH signal using the 16 secondary correlators 134a-p;

Step 406: Determine the mean PSCH slot synchronization phase difference $\Delta P_{MEAN}$ and the MSE of these phase differences $\Delta P_{MSE}$ over the preceding frame's worth of slots (15). This can be performed with a procedure such as that of FIG. 9. Then, determine if the MSE of these phase differences $\Delta P_{MSE}$ is greater than or equal to the threshold, $P_T$. If the calculated $\Delta P_{MSE}$ is greater than or equal to the threshold proceed to step 408, otherwise go to step 410. In relation to FIG. 8, this step is performed byte decision logic 145 in accordance with equations (1), (2), and (3);

Step 408: Coherently combine the frame synchronization correlation results output by the secondary correlators 134a-p with the mean slot synchronization phase difference $\Delta P_{MEAN}$ output by the complex conjugate processor 144 using the multipliers 146;

Step 410: Coherently combine the frame synchronization correlation results output by the secondary correlators 134a-p with the slot synchronization phase P(n) output by the complex conjugate processor 144 using the multipliers 146;

Step 412: Accumulate the correlation results with the accumulators 152, and tabulate the entries Wxx representing the secondary correlation results of the SSCH 16s (FIG. 2) code group sequences with the controller 154, the CFRS 156 unit, and the memory 158;

Step 414: Select the maximum table entry Wxx to determine the frame boundary with the selector 160;

Step 416: Referencing the determined frame boundary, determine the code group of the received signal with the stage 3 130 of FIG. 7;

Step 418: End.

Regarding the present invention, the steps of the above method that are of primary importance are steps 406 through 410. In addition, the comparison of step 406 depends on the definition of the threshold and on how a device executing the procedure stores and compares information. That is, the comparison can be a less than equal to evaluation or similar.

Figure 11:
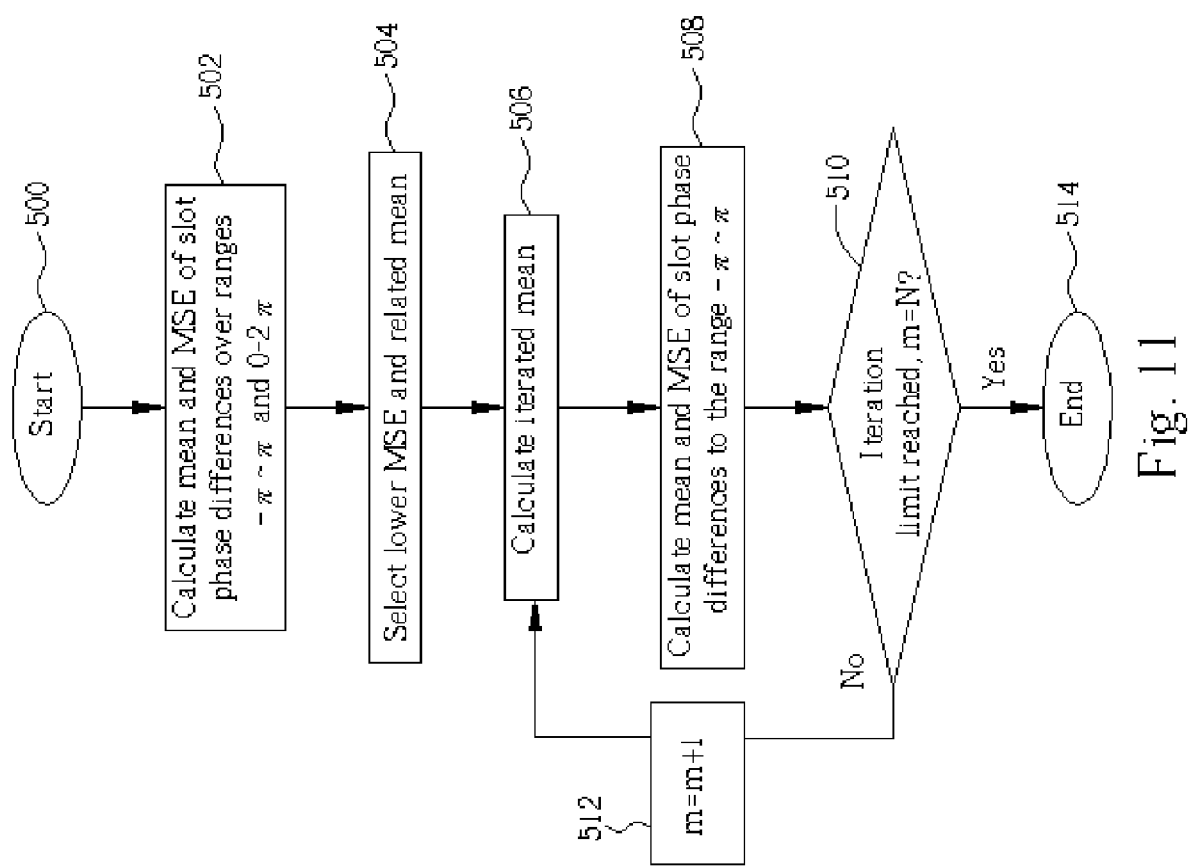
FIG. 11 is a flowchart of a mean and mean square error determination according to a second embodiment.

FIG. 11 illustrates a flowchart of a method according to a second embodiment of determining the mean and MSE.

Figure 12:
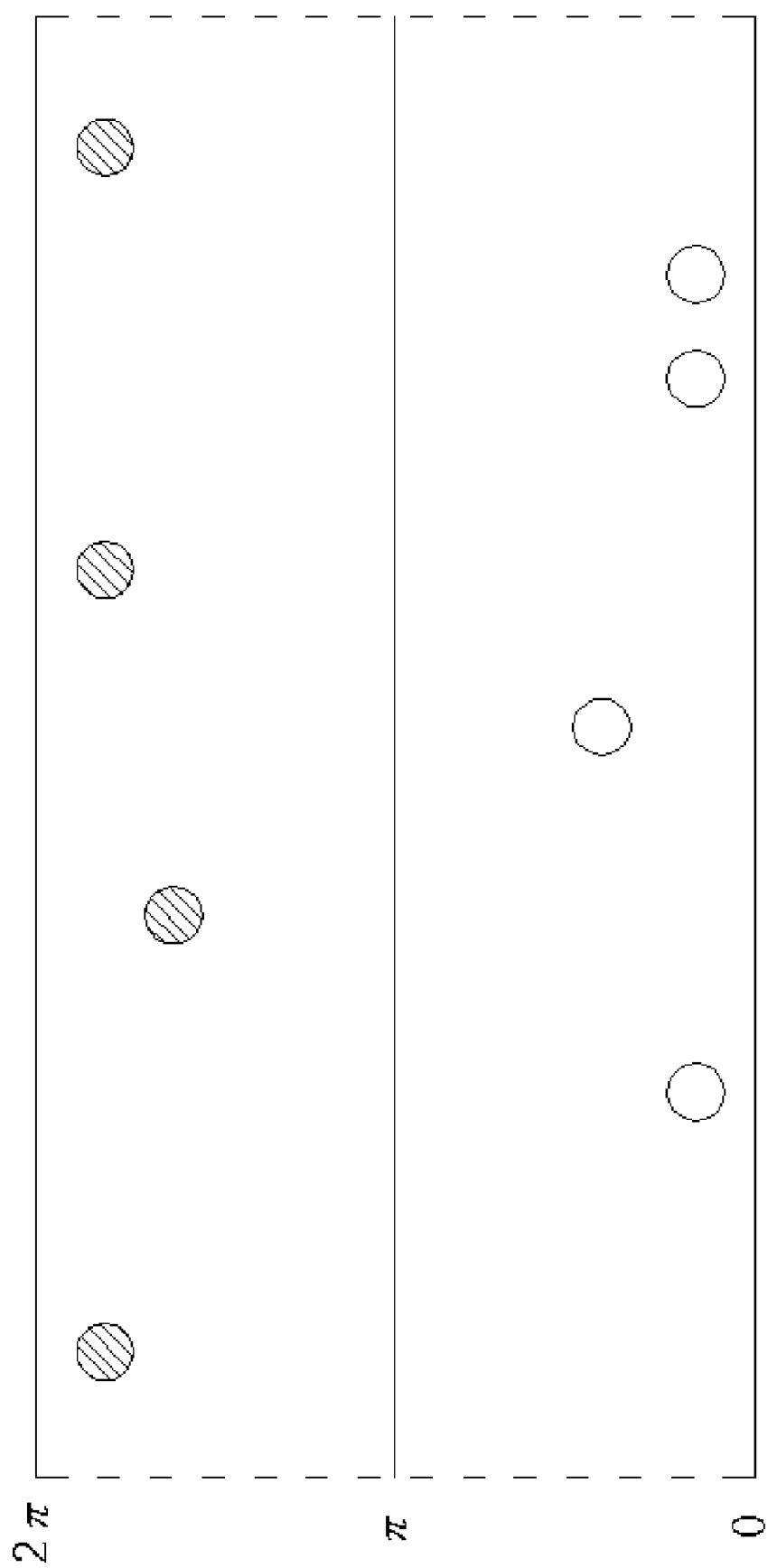
FIGS. 12 and 13 are graphs illustrating phase ranges relating to the method of FIG. 11.
Figure 13:
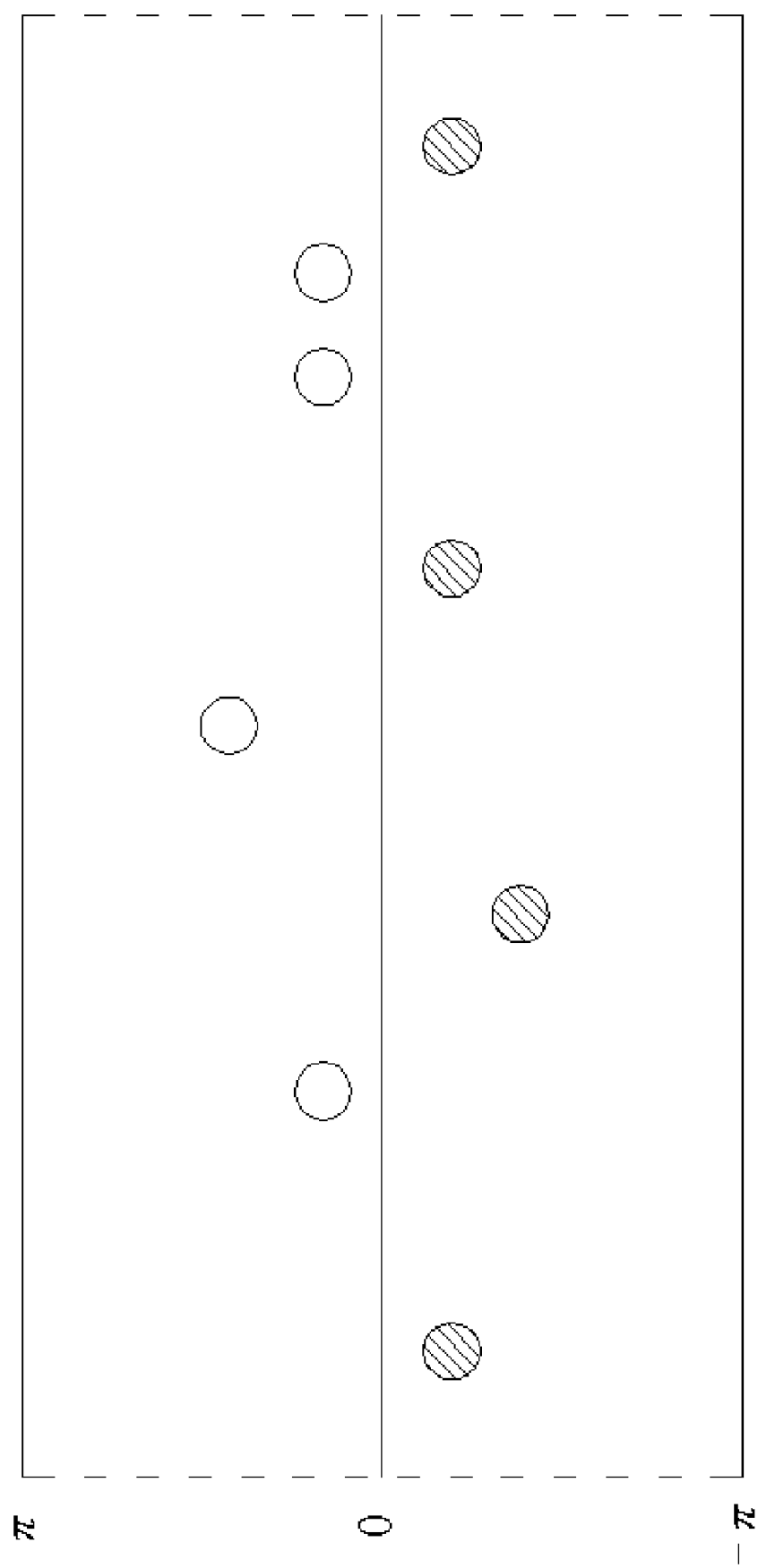

The second embodiment method modulates the slot phase differences into two ranges and calculates the mean and MSE separately, the two ranges being illustrated in FIG. 12 and FIG. 13. The mean corresponding to the smaller MSE is selected and, further, the mean and MSE calculations are iterated for improved accuracy. The second embodiment mean and MSE determination is described in detail as follows:

Step 500: Start;

Step 502: Calculate the mean and MSE of the slot phase differences referencing equations (1), (2), and (3) over two distinct ranges, namely $-\pi\sim\pi$ and $0\text{-}2\pi$;

Step 504: Select the MSE of step 502 having the lower value, and select the corresponding mean. Set an initial mean value $\Delta P_{MEAN}(0)$ to the mean calculated in step 502 corresponding to the lower MSE. In addition, set an iteration counter m to zero;

Step 506: Determine the iterated mean according to equation (4);

Step 508: Calculate the mean and MSE of the slot phase differences to the range $-\pi\sim\pi$ referencing equations (2), (3), and (5);

Step 510: Has the iteration limit been reached? That is, does the current iteration index, m, equal a number of iterations allowed, N? If the iteration limit has been reached proceed to step 514, otherwise go to step 512;

Step 512: Advance to the next iteration, m=m+1;

Step 514: End.

$$\Delta P'_{MEAN} = \sum_{w=0}^{m} \Delta P'_{MEAN}(w) \quad (4)$$

$$\Delta P'(n) = \Delta P(n) - \Delta P'_{MEAN} \quad (5)$$

As shown in FIGS. 12 and 13, the measured slot synchronization phases may occur in different phase ranges. The above method illustrated in FIG. 11 compensates for uncertainties in the actual phase range of the slot synchronization phases, and consequently results in improved accuracy.

In contrast to the prior art, the present invention compares a mean square error of a plurality of slot synchronization phases to a threshold, and then selects a corresponding mean slot synchronization phase or a single slot synchronization phase based on the comparison result. The threshold is set based on an anticipated or measured signal to noise ratio. Thus, in a varying signal to noise environment, accurate frame synchronization and the corresponding code group and cell search determination can be readily achieved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for achieving frame synchronization of a received signal, the received signal being divided into frames with each frame comprising a plurality of slots, the method comprising:
   correlating the received signal with a plurality of predetermined correlators to obtain a plurality of frame synchronization correlation results;
   coherently combining frame synchronization correlation results with a slot synchronization phase, the slot synchronization phase determined by correlating the received signal with a slot synchronization sequence, when a test phase difference is less than a threshold phase difference;
   coherently combining frame synchronization correlation results with a linear combination of slot synchronization phases when the test phase difference is greater than or equal to the threshold phase difference; and
   determining a frame boundary of the received signal based on the coherent combination results.

2. The method of claim 1 wherein the linear combination is determined by:
   determining a difference between a current slot synchronization phase and at least a previous slot synchronization phase; and
   averaging slot synchronization phase differences.

3. The method of claim 2 wherein a frame comprises 15 consecutive slots, and the average comprises 14 slot synchronization phase differences from the 15 consecutive slots.

4. The method of claim 1 wherein the test phase difference is a mean square error (MSE) phase difference of a predetermined number of slot synchronization phases.

5. The method of claim 1 wherein the threshold phase difference is selected referencing an expected signal to noise ratio (SNR) range of the received signal; such that the coherent combination of frame synchronization correlation results is with the slot synchronization phase when the SNR is in a high range, and with the linear combination of slot synchronization phases when the SNR is in a low range.

6. The method of claim 1 wherein determining the frame boundary comprises:
   accumulating the coherent combination results over a predetermined number of slots; and
   selecting a maximum value of the coherent combination results to determine the frame boundary and a corresponding code group.

7. The method of claim 1 wherein 16 predetermined correlators are provided, the received signal including one of 64 combinations of the 16 predetermined correlators in a set of 15 symbols per frame at one symbol per slot.

8. A wireless device for performing the method of claim 1.

9. A wireless device comprising:
   a receiver for receiving a signal divided into frames with each frame comprising a plurality of slots;
   a first stage for receiving slot synchronization phases of the received signal;
   a plurality of correlators for outputting a plurality of frame synchronization correlation results of the received signal;
   a combiner for coherently combining the frame synchronization correlation results with a slot synchronization phase when a test phase difference is less than a threshold phase difference or a linear combination of slot synchronization phases when the test phase difference is greater than or equal to the threshold phase difference; and
   a selection unit for selecting a frame boundary based on the output of the combiner.

10. The wireless device of claim 9 wherein the combiner includes a simple average processor that calculates the linear combination by:
    determining a difference between a current slot synchronization phase and at least a previous slot synchronization phase; and
    averaging slot synchronization phase differences.

11. The wireless device of claim 10 wherein a frame comprises 15 consecutive slots, and the average calculated by the simple average processor comprises 14 slot synchronization phase differences from the 15 consecutive slots.

12. The wireless device of claim 9 wherein the combiner includes a simple average processor for calculating the test phase difference as a mean square error (MSE) phase difference of a predetermined number of slot synchronization phases.

13. The wireless device of claim 9 wherein the combiner is capable of setting the threshold phase difference referencing an expected signal to noise ratio (SNR) range of the received signal; such that the coherent combination of frame synchronization correlation results is with the slot synchronization phase when the SNR is in a high range, and with the linear combination of slot synchronization phases when the SNR is in a low range.

14. The wireless device of claim 9 wherein the selection unit comprises a plurality of accumulators for accumulating output of the combiner over a predetermined number of slots.

15. The wireless device of claim 9 wherein the combiner includes 16 correlators each having a predetermined correlation value, the received signal including one of 64 combinations of the 16 predetermined correlation values in a set of 15 symbols per frame at one symbol per slot.

* * * * *